US011514704B2

(12) United States Patent
Ling et al.

(10) Patent No.: US 11,514,704 B2
(45) Date of Patent: Nov. 29, 2022

(54) METHOD AND APPARATUS OF GAME STATUS DETERMINATION

(71) Applicant: Intel Corporation, Santa Clara, CA (US)

(72) Inventors: Chen Ling, Beijing (CN); Ming Lu, Beijing (CN); Qiang Li, Beijing (CN); Wenlong Li, Beijing (CN); Xiaofeng Tong, Beijing (CN); Yikai Fang, Beijing (CN); Yumeng Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/057,020

(22) PCT Filed: Oct. 2, 2018

(86) PCT No.: PCT/CN2018/109237
§ 371 (c)(1),
(2) Date: Nov. 19, 2020

(87) PCT Pub. No.: WO2020/069634
PCT Pub. Date: Apr. 9, 2020

(65) Prior Publication Data
US 2021/0158033 A1 May 27, 2021

(51) Int. Cl.
*G06K 9/00* (2022.01)
*G06V 40/10* (2022.01)
(Continued)

(52) U.S. Cl.
CPC ............ *G06V 40/103* (2022.01); *G06V 20/42* (2022.01); *G06V 20/46* (2022.01); *G06V 40/23* (2022.01)

(58) Field of Classification Search
CPC ............ G06K 9/00369; G06K 9/00342; G06K 9/00724; G06K 9/00744; G06K 9/00718
See application file for complete search history.

(56) References Cited

U.S. PATENT DOCUMENTS

2012/0322551 A1 12/2012 Brennan et al.
2013/0271458 A1* 10/2013 Andriluka ................. G06T 7/55
345/420

(Continued)

FOREIGN PATENT DOCUMENTS

CN 105263040 A 1/2016
CN 102457678 A 5/2016

OTHER PUBLICATIONS

International Search Report and Written Opinion dated Jun. 27, 2019 for International Patent Application No. PCT/CN2018/109237, 7 pages.

*Primary Examiner* — Dhaval V Patel
(74) *Attorney, Agent, or Firm* — Schwabe, Williamson & Wyatt, P.C.

(57) ABSTRACT

A video capture and processing system includes a memory configured to store a pose database. The pose database includes poses that indicate a start or stoppage in an event. The system also includes a processor operatively coupled to the memory. The processor is configured to generate a pose of an individual in a video frame of captured video of the event. The pose can be three-dimensional pose or a two-dimensional pose. The processor is also configured to determine, based on the pose database, whether the pose of the individual indicates a start or a stoppage in the event. The processor is further configured to control an upload of video of the event based on the determination of whether the pose indicates the start or the stoppage in the event.

25 Claims, 10 Drawing Sheets

(51) Int. Cl.
*G06V 20/40* (2022.01)
*G06V 40/20* (2022.01)

(56) References Cited

U.S. PATENT DOCUMENTS

| | | | |
|---|---|---|---|
| 2014/0002338 A1* | 1/2014 | Raffa | G06F 1/1694 |
| | | | 345/156 |
| 2014/0201284 A1 | 7/2014 | Horie | |
| 2014/0274396 A1 | 9/2014 | Mikhailov | |
| 2015/0324636 A1* | 11/2015 | Bentley | A63F 13/00 |
| | | | 386/227 |
| 2017/0300781 A1* | 10/2017 | Lehrmann | G06K 9/6219 |
| 2018/0039825 A1* | 2/2018 | Fujikake | G06V 20/49 |

* cited by examiner

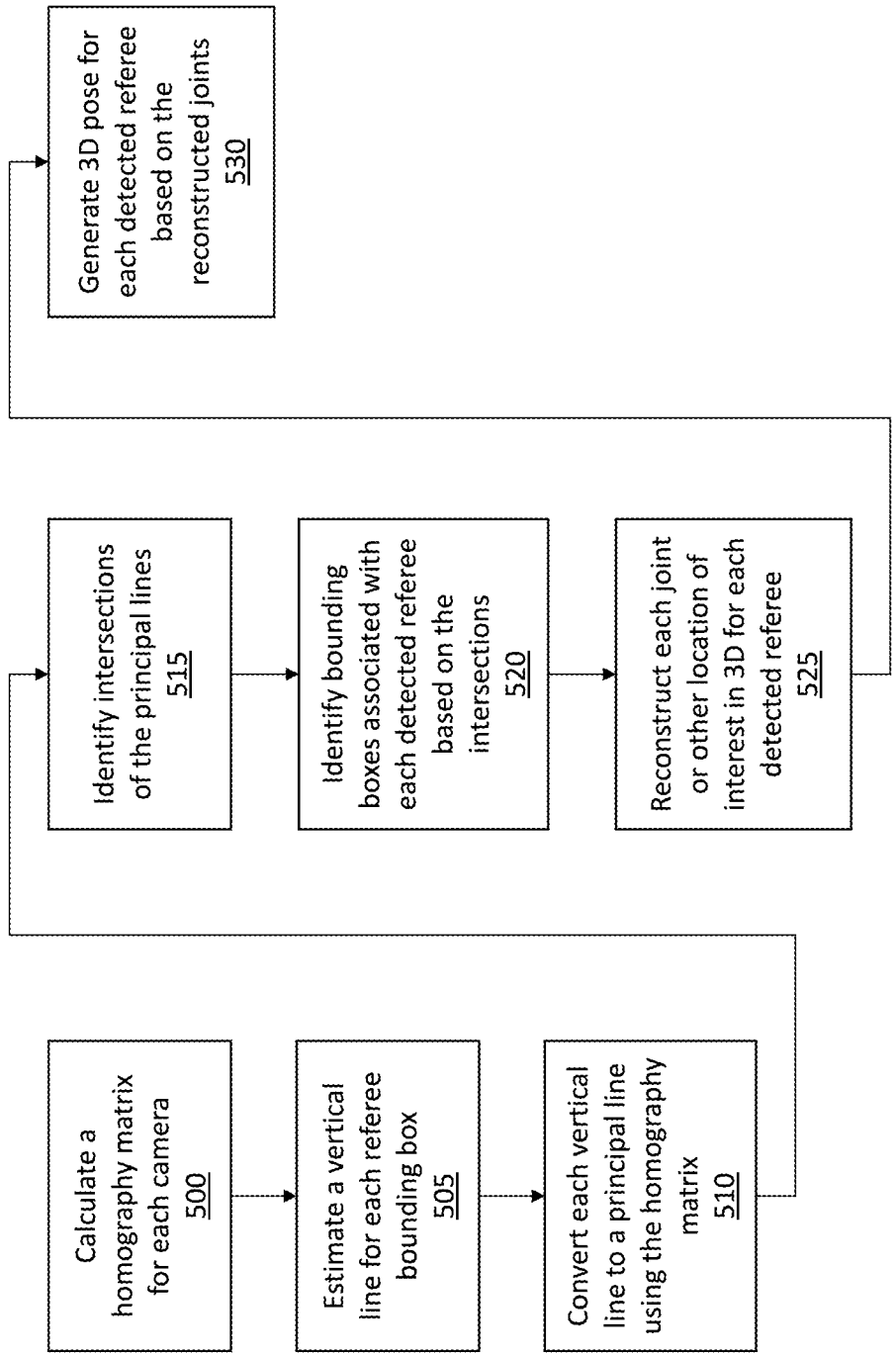

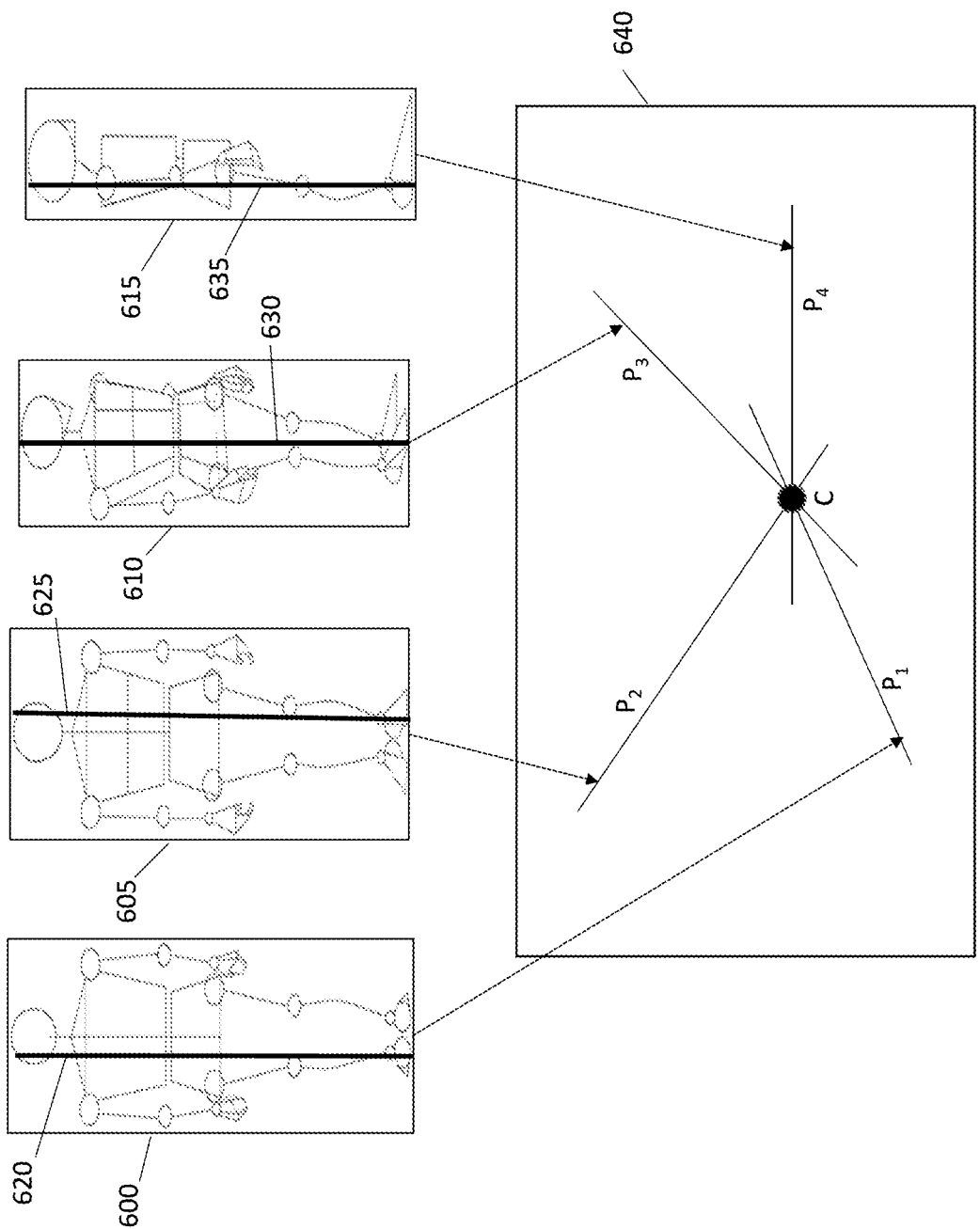

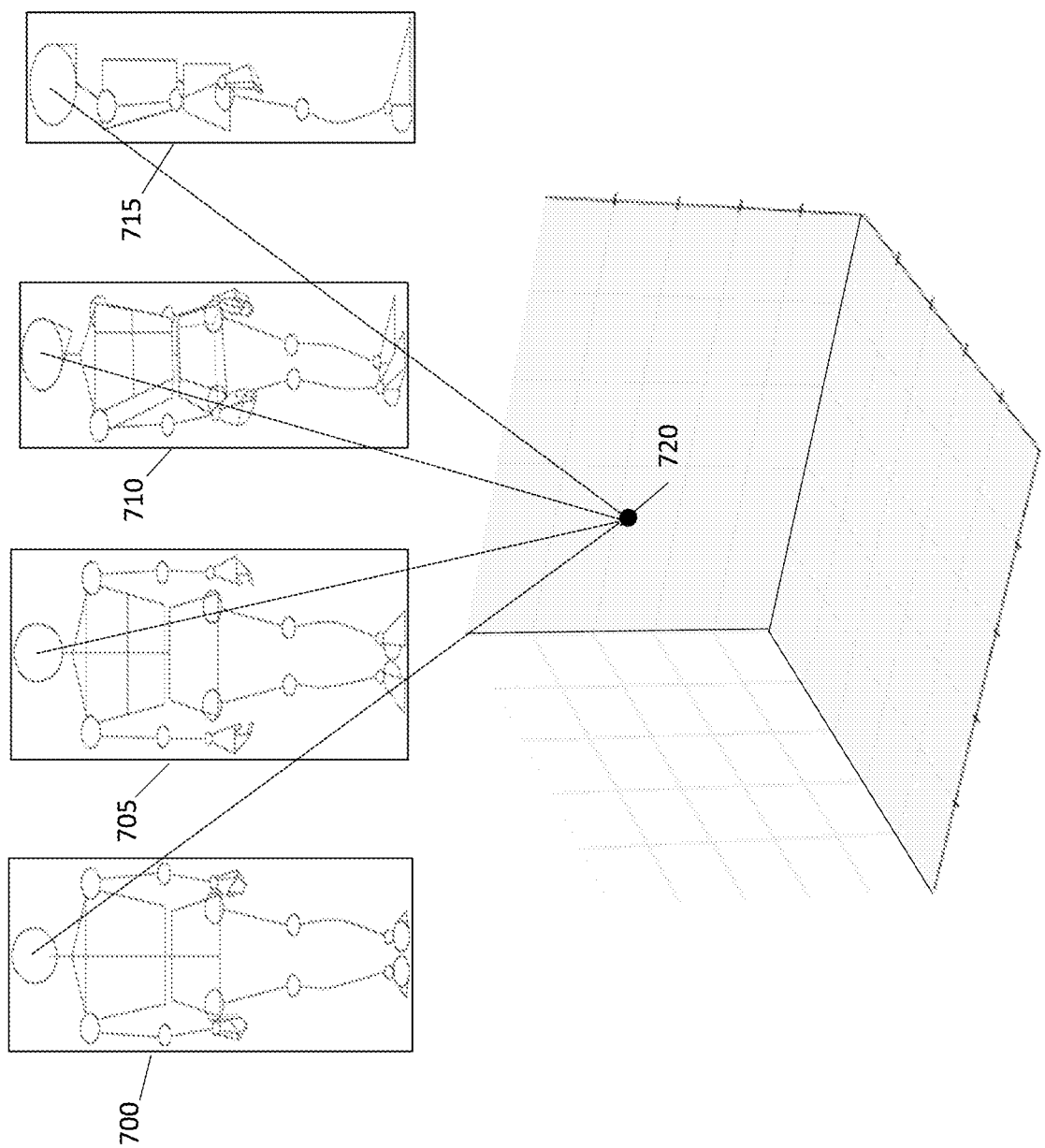

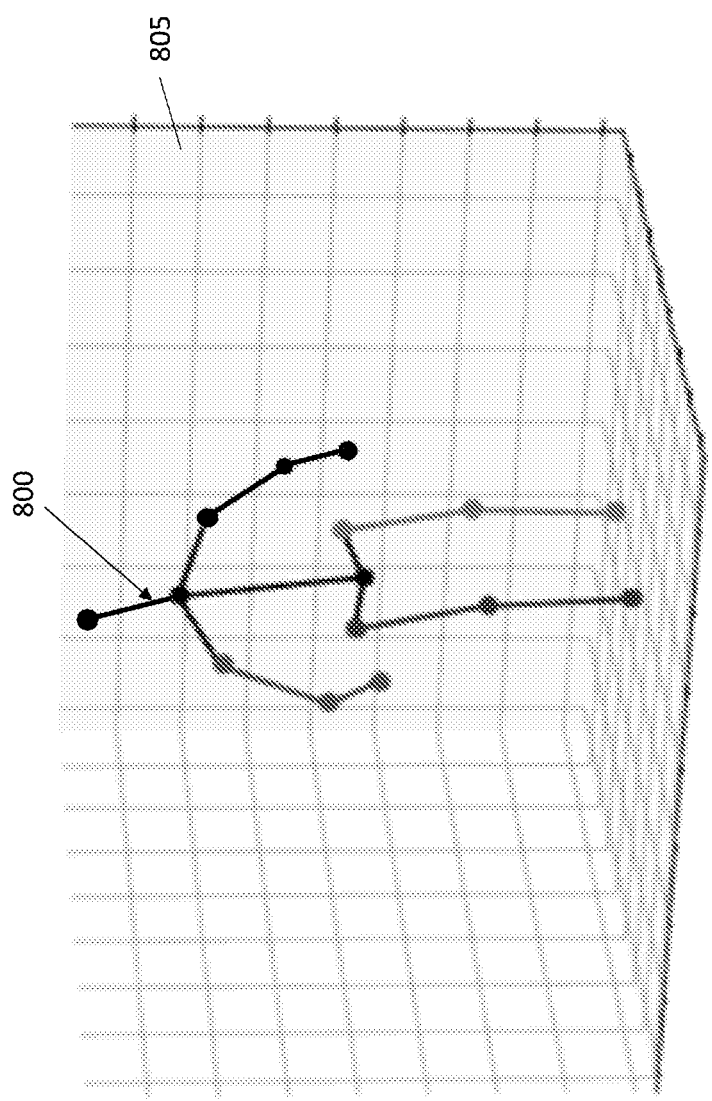

METHOD AND APPARATUS OF GAME STATUS DETERMINATION

CROSS REFERENCE TO RELATED APPLICATIONS

The present application is a national phase entry under 35 U.S.C. § 371 of International Application No. PCT/CN2018/109237, filed Oct. 2, 2018, entitled "METHOD AND APPARATUS OF GAME STATUS DETERMINATION", which designated, among the various States, the United States of America. The Specifications of the PCT/CN2018/109237 Application is hereby incorporated by reference.

BACKGROUND

Sporting events are enjoyed by viewers all around the world and generate billions of dollars worldwide through ticket sales, advertising revenue, apparel and memorabilia sales, etc. While some viewers are able to experience the sporting events through in person attendance at the sporting venue, other viewers watch the sporting events on television or through a computing device that receives the sporting event through a computing network. Given the fast pace of many sports and the sometimes large number of actions occurring simultaneously during a sporting event, viewers often miss important parts of the sporting event on an initial viewing. To remedy this and make the viewing experience more complete, complex replay systems have been developed for sporting events. For example, the True View system by Intel® utilizes multiple high resolution cameras positioned around a sporting venue to provide 360 degree replay capability in high definition.

BRIEF DESCRIPTION OF THE DRAWINGS

Illustrative embodiments of the invention will hereafter be described with reference to the accompanying drawings, wherein like numerals denote like elements.

FIG. 5 is a flow diagram depicting a 3D referee pose generation process in accordance with an illustrative embodiment.

FIG. 6 depicts association of referee bounding boxes for a given referee in accordance with an illustrative embodiment.

FIG. 7 depicts generation of a 3D point corresponding to the head of a referee in accordance with an illustrative embodiment.

FIG. 8 depicts a 3D pose of a referee in accordance with an illustrative embodiment.

DETAILED DESCRIPTION

Figure 1:
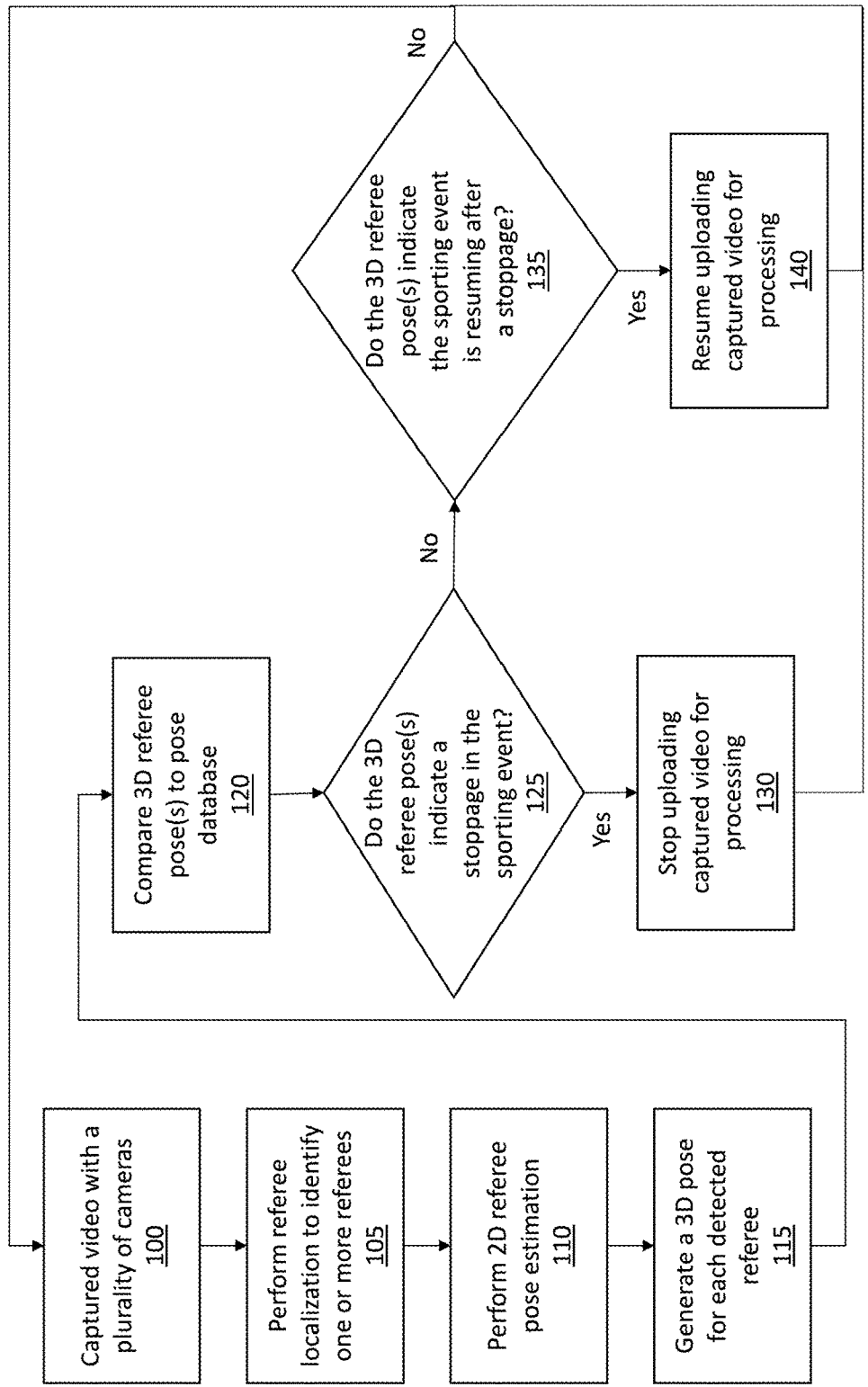
FIG. 1 is a flow chart depicting operations performed by a video capture and processing system in accordance with an illustrative embodiment.

Currently employed systems for capturing sporting events and providing replay capabilities can be very complex in nature. In some implementations, multiple high resolution cameras are positioned all around a sporting venue such as a stadium, arena, court, pitch, field, golf course, etc. to enable capture of video (or images) of the sporting event in 360 degrees. A computing system is used to perform segmentation and three-dimensional (3D) reconstruction to generate volumetric content based on the captured video. The computing system also performs rendering to allow a user to view a high definition replay of any portion of the sporting event at any desired angle. This allows the user to view plays that he/she may have missed, plays that are controversial, plays that involve close calls by an official or referee, etc. In some systems, the captured video is transmitted to the cloud and the segmentation, reconstruction, and/or rendering is performed at a remote location such as a data processing center.

The amount of data captured by such a system can be large, and may exceed 1 terabyte (TB) of data per minute. It can be costly to upload this large amount of data for processing in the cloud. Additionally, the processing has to be performed by a computing system with significant processing power. As a result, it can cost thousands of dollars to create a single hour of content. Traditional sporting event capturing systems capture and process content from the start of the sporting event until the end of the sporting event. However, most sporting events include periods of time during which the sporting event is not being played, such as an intermission, half time, commercial break, etc. For example, a typical football game includes 60 minutes of game play, but the duration of the football game including breaks in the action is often in excess of 3 hours. The capturing and processing of video during such breaks in the sporting event results in significant added costs to the system provider, and results in little or no value to the end user.

One way to avoid these additional costs resulting from the capture and processing of breaks during sporting events is for an operator to manually control the system such that the system is only active during the portions of the sporting event that involve actual game play. However, use of a human operator to manually control the system is subject to human error and can result in portions of the game play not being captured and processed by the system. Other ways to avoid the capture and processing of video during breaks in sporting events is to utilize human or machine labeled metadata such as timestamps, captions, scoreboards, etc. or audio data associated with a broadcast of the sporting event to provide indications of when breaks occur. However, these techniques further complicate the system and require time synchronization among different data sources (i.e., video, metadata, and/or audio) to be effective. Additionally, not all systems utilize or have access to such metadata or audio data.

Described herein are methods and apparatus for automatically controlling a video capture and processing system for a sporting event based on game status to ensure that the system is not sending captured video to the cloud for processing during breaks in the sporting event. The proposed methods and apparatus result in reduced storage requirements for the system, reduced uploads, reduced processing power used by the system, and an overall cost savings based on the reduction in captured video and processing. In an illustrative embodiment, the proposed methods and apparatus perform action recognition on one or more referees or officials that are overseeing the sporting event. When a referee performs an action indicating that game play is to be stopped, the action is recognized by the system. Responsive to the recognized action, the system stops uploading the captured video for processing and use in the replay system. However, the system continues to capture video locally and to monitor the referee(s). Upon recognition of a referee action that indicates game play is about to resume, the system automatically resumes uploading the captured video for processing and eventual use in the replay product.

The embodiments described herein are with reference to sporting events. However, in alternative implementations, the proposed methods and systems can be used for any other type of event i) which is captured via video, ii) which has breaks/pauses in the event that can be excluded from the video capture, and iii) which include an individual or object that indicates starts and stoppages of the event. Such events may include musical performances, theater performances, dance recitals, etc.

FIG. 1 is a flow chart depicting operations performed by a video capture and processing system in accordance with an illustrative embodiment. In alternative embodiments, fewer, additional, and/or different operations may be performed. Additionally, the use of a flow diagram is not meant to be limiting with respect to the order of operations performed. In an illustrative embodiment, the video capture and processing system includes a plurality of video cameras, one or more computer processors, one or more computer memories or other data storage components, one or more transceivers, etc. Components of the video capture and processing system are described in detail below with reference to FIG. 9. At least a portion of the components of the video capture and processing system are located at a sporting venue of a sporting event which is being captured.

In an operation 100, the system captures video with a plurality of cameras. The plurality of cameras are positioned around a sporting venue to provide 360 degree coverage of the sporting event. The sporting venue can be a football field, a soccer field, a golf course, a basketball court, a tennis court, a racetrack, a bowling alley, a baseball field, a hockey rink, a swimming pool, an olympic stadium or venue, etc. The captured video can be provided from the video cameras to a computing system of the video capture and processing system via a wired or wireless connection using any data transmission techniques known in the art. The captured video is in the form of sequences of video frames captured by the plurality of cameras.

Figure 2:
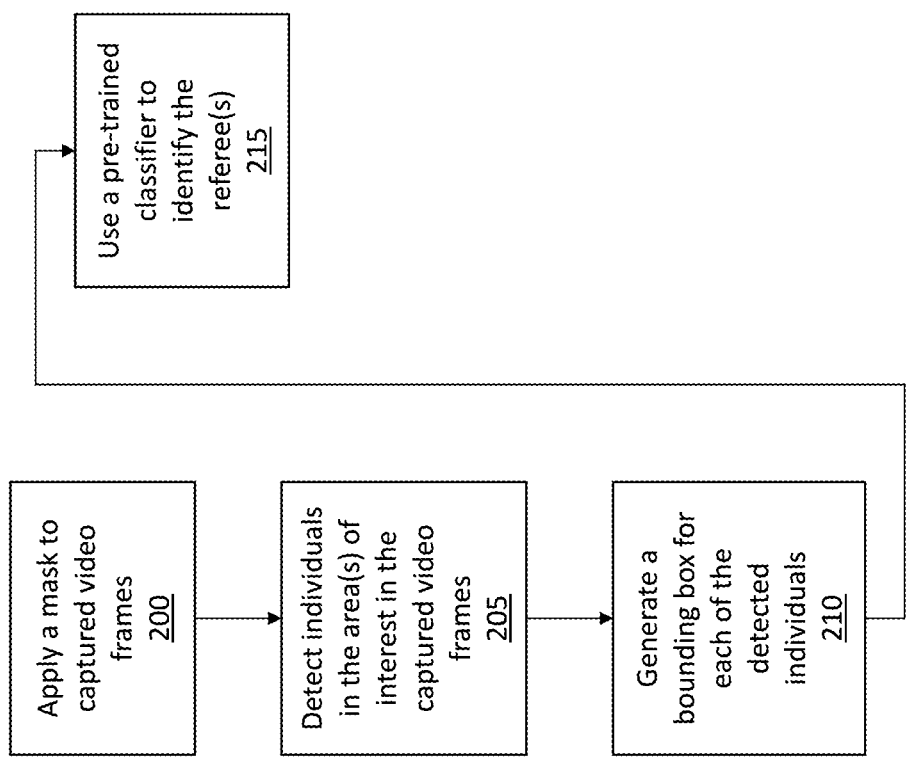
FIG. 2 is a flow diagram depicting referee localization in accordance with an illustrative embodiment.

In an operation 105, the system performs referee localization to identify one or more referees of the sporting event. As used herein, a referee can refer to any official, referee, linesman, judge, or other individual that monitors, adjudicates, and/or controls a sporting event. The referee localization is performed on video frames captured by each camera in the plurality of cameras. FIG. 2 is a flow diagram depicting referee localization in accordance with an illustrative embodiment. In alternative embodiments, fewer, additional, and/or different operations may be performed. Additionally, the use of a flow diagram is not meant to be limiting with respect to the order of operations performed.

In an operation 200, the system applies a mask to the frames of the captured video. The mask is used to exclude portions of the sporting venue in which the referee(s) are not expected to be positioned. Use of such a mask reduces the amount of imagery in the video frames that has to be analyzed to identify the referee(s), and therefore saves time and reduces processing power. As an example, the mask can be used to exclude areas designated for spectators, areas designated for players only (e.g., a sideline of a football field), areas designated for concessions sales, areas designated for commentators, etc. In an illustrative embodiment, the mask can exclude all areas of the sporting venue except for a playing field/area that is designated for players and referees. Using football as an example, the mask can exclude from the captured video frames all areas of the football stadium except for the 100 yard football field and the end zone on each end of the football field. Using basketball as an example, the mask can exclude from the captured video frames all areas of the basketball arena except for the basketball court itself.

The mask can be applied based on a stored layout of the sporting venue that is accessible to the system. Specifically, the system can be trained based on the layout of the sporting venue to identify the area or areas of interest (e.g., the football field). The system is then able to identify this area (or areas) of interest in the captured video frames and exclude all other areas present in the frames. Alternatively, any other mask application techniques known in the art may be used. In another alternative embodiment, the mask may not be used and the system may analyze the entire captured frame during the referee localization process.

Figure 3A:
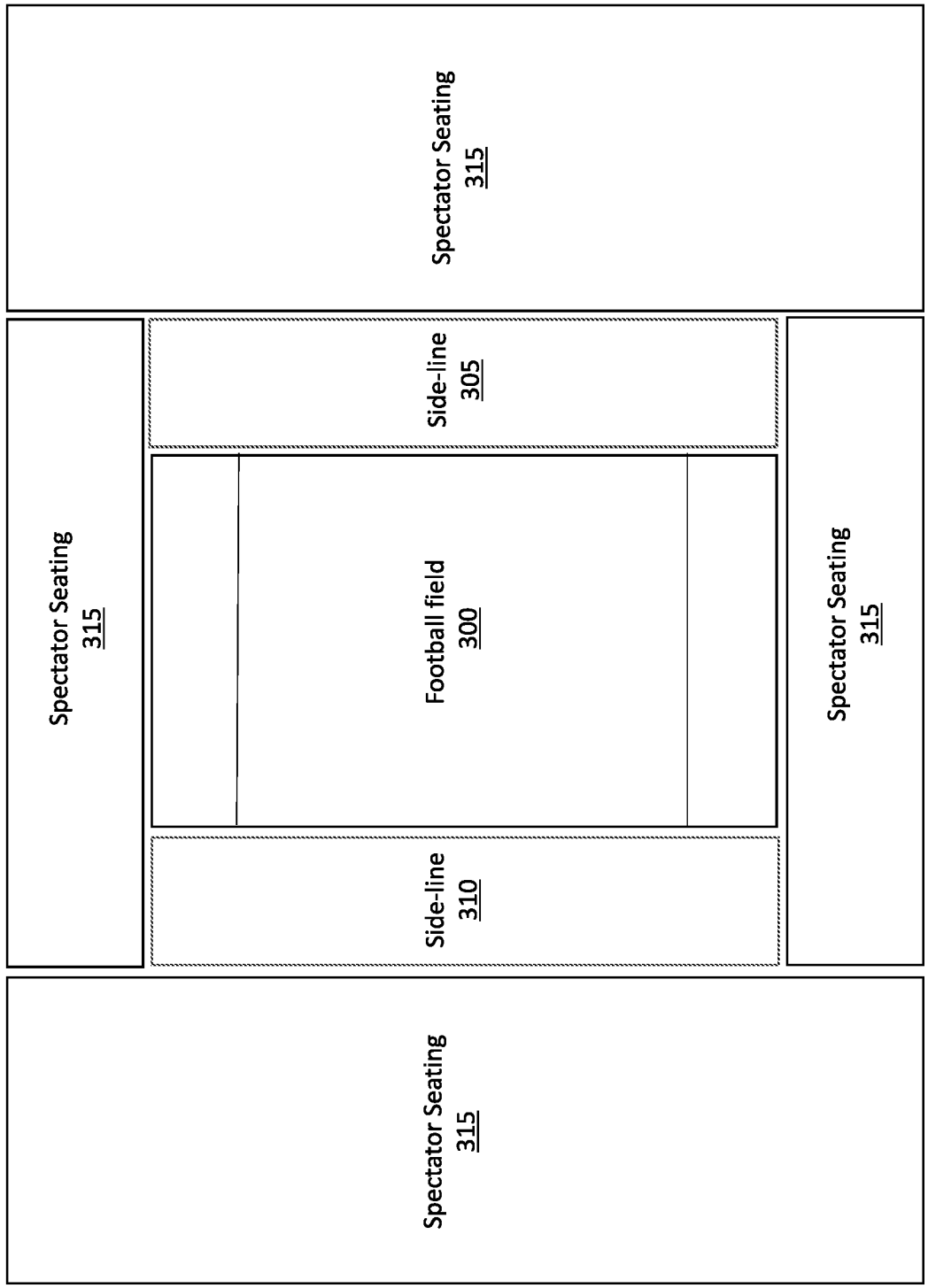
FIG. 3A depicts a captured video frame of a football stadium in accordance with an illustrative embodiment.
Figure 3B:
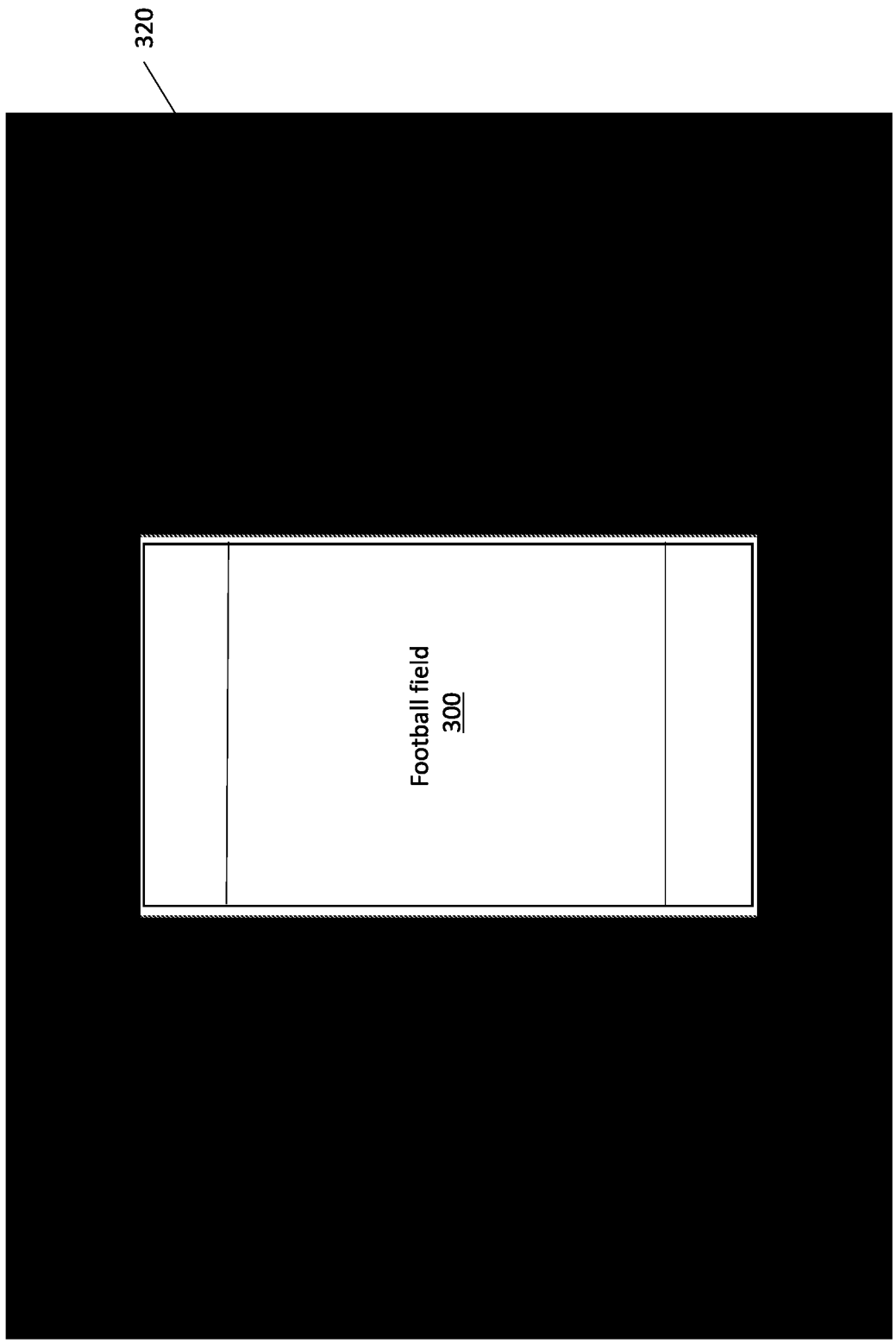
FIG. 3B depicts the captured video frame of FIG. 3A with an applied mask to exclude areas of the football stadium in accordance with an illustrative embodiment.

FIG. 3A depicts a captured video frame of a football stadium in accordance with an illustrative embodiment. FIG. 3B depicts the captured video frame of FIG. 3A with an applied mask to exclude areas of the football stadium in accordance with an illustrative embodiment. As shown in FIG. 3A, the captured video frame of the football stadium includes a football field 300, a first sideline 305, a second sideline 310, and at least a portion of 4 sections of spectator seating 315. It is expected that the referees for the football game will be on the football field 300. As shown in FIG. 3B, a mask 320 is applied to the captured video frame as discussed above such that the computerized detection of referees is limited to the football field 300, which is the area where the referees are supposed to be positioned. Use of the mask 320 conserves resources of the system and increases the speed with which referee detection is performed.

Referring again to the referee localization process depicted in FIG. 2, in an operation 205, the system detects individuals in the area(s) of interest in the captured video frames. The area(s) of interest are the areas which have not been masked out of the captured video frames. The detected individuals may include players and referees, and any other individuals that happen to be in the area(s) of interest. The system can use one or more human detection methods to detect the individuals, such as a Faster Regional-Convolutional Neural Network (Faster R-CNN), a Single Shot Multibox Detector (SSD), You Only Look Once (YOLO) object detection, etc.

In an operation 210, the system generates a bounding box for each of the detected individuals. The bounding box is an area within the captured video frame that includes all or a portion of each of the detected individuals. For example, if the system detects that a given video frame includes 29 individuals on the football field, the system can generate 29 bounding boxes for that video frame such that each of the detected individuals is associated with a distinct bounding box. In an illustrative embodiment, the bounding boxes are generated based on the information regarding the location of individuals in the video frame that is obtained using the human detection method(s) of the operation 205.

In an operation 215, the system uses a pre-trained classifier to identify the referee(s) in the captured video frame. The pre-trained classifier can be implemented as software that includes information which distinguishes the referees from the other individuals (e.g., players) appearing in the captured video frame. The system uses the pre-trained classifier to analyze each of the bounding boxes to determine whether the bounding box includes a referee or a non-referee. The analysis can be based on a type of clothing worn by the referees (or players), a color of clothing worn by the referees (or players), a pattern on the clothing of the referees (or players), a symbol worn by the referees (or players), etc.

In an illustrative embodiment, the referee localization process is performed for each video frame captured from each of the plurality of cameras positioned in the sporting venue. A result of the referee localization process is therefore a plurality of bounding boxes for each detected referee, where the plurality of bounding boxes includes one bounding box from each of the plurality of cameras in which the referee is captured. As an example, the system may include 10 video cameras, each of which captures a video frame at a time $t_0$. Additionally, there may be 7 detected referees in the area(s) of interest in the sporting venue, and each of the 10 video cameras may be positioned to capture all 7 of the referees at the time $t_0$. A result of the referee localization process can therefore include 10 bounding boxes corresponding to each referee (i.e., one from each camera) for a total of 70 bounding boxes of interest at the time t. This process can be repeated for each subsequent video frame captured by each of the plurality of cameras, such as frames captured at time $t_1$, frames captured at time $t_2$, etc. Alternatively, the referee localization may be performed on only a portion of the video frames captured by each of the plurality of cameras.

Referring back to FIG. 1, the system performs two-dimensional (2D) referee pose estimation in an operation 110. The 2D referee pose estimation is performed based on the referee localization conducted in the operation 105. Specifically, the system analyzes each of the bounding boxes from the operation 105 which have been determined to include a referee, and determines the 2D pose of the referee for each of the plurality of cameras. In an illustrative embodiment, the 2D pose estimation is used to identify the position of a plurality of joints and/or other locations/points of interest (i.e., body parts) of the referee. For example, the 2D pose estimation can be used to identify a left shoulder, a right shoulder, a head in general, a nose, one or both eyes, a right elbow, a left elbow, a right hand, a left hand, a torso, a right hip joint, a left hip joint, a right knee, a left knee, a right foot, a left foot, etc. in each of the bounding boxes that has been determined to include a referee.

The 2D pose estimation can also be used to determine the relationship between the joints and/or other body parts of the referee. For example, the 2D pose estimation can be used to identify a relationship between a head of the referee and a torso of the referee, a relationship between the left shoulder and left elbow, a relationship between the right shoulder and the right elbow, a relationship between a right elbow and a right hand, a relationship between a left elbow and a left hand, a relationship between a right hip and a right knee, a relationship between a left hip and a left knee, a relationship between a right knee and a right foot, a relationship between a left knee and a left foot, etc. In an illustrative embodiment, the 2D pose estimation is performed using a software product such as HourGlass. Alternatively, any other program or technique may be used, such as AlphaPose, OpenPose, etc.

Figure 4B:
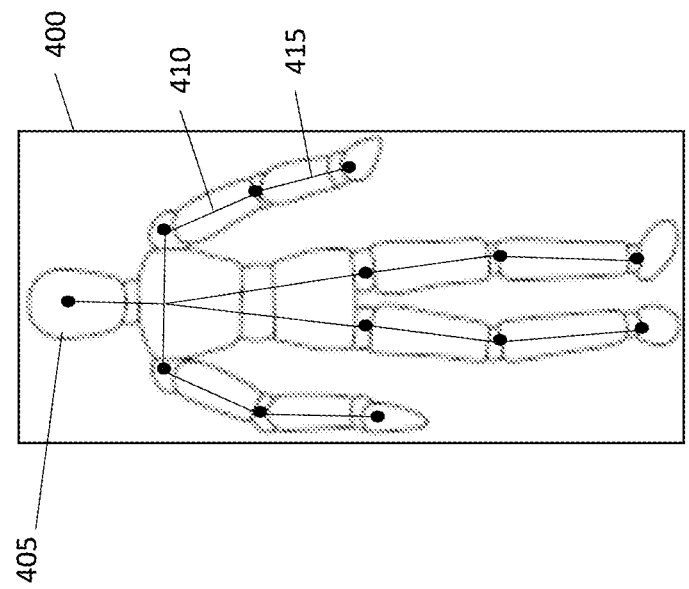
FIG. 4B depicts results of a 2D pose estimation process performed on the referee in the bounding box of FIG. 4A in accordance with an illustrative embodiment.
Figure 4A:
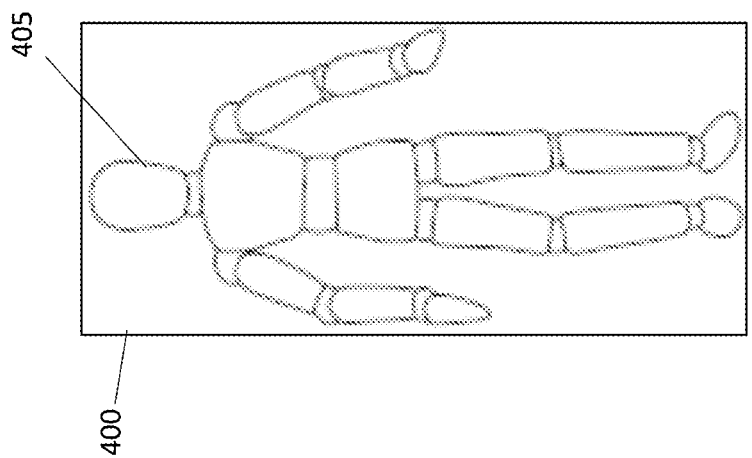
FIG. 4A depicts a bounding box that includes a referee in accordance with an illustrative embodiment.

FIG. 4A depicts a bounding box 400 that includes a referee 405 in accordance with an illustrative embodiment. FIG. 4B depicts results of a 2D pose estimation process performed on the referee 405 in the bounding box 400 of FIG. 4A in accordance with an illustrative embodiment. In the embodiment of FIG. 4B, the results of the 2D pose estimation process is a series of points corresponding to the joints and other locations of interest on the referee, along with interconnected lines that represent the relationships between the various adjacent points on the referee's body. For example, a line 410 depicts a relationship between a left shoulder and a left elbow of the referee 405. Specifically, a first end of the line 410 is at the left shoulder and a second end of the line 410 is at the left elbow. Similarly, a line 415 depicts the relationship between the left elbow and a left hand (or wrist) of the referee 405. The remaining lines of the 2D pose estimation represent other body parts of the referee 405 and relationships between the body parts, including a nose, torso, right shoulder, right elbow, right hand (or wrist), left hip, right hip, left knee, right knee, left foot (or ankle), and right foot (or ankle) of the referee 405. In alternative embodiments, any other body parts of the referee 405 may be included in the 2D pose estimation.

In an illustrative embodiment, the 2D pose estimation is performed on captured frames from each of the plurality of cameras. Continuing the example above of a system with 10 video cameras and 7 detected referees, the system conducts the 2D pose estimation on each of the 70 bounding boxes of interest. In another illustrative embodiment, this 2D pose estimation process is performed on each video frame captured by each camera at a given time t. Alternatively, the 2D pose estimation may be performed on only a portion of the video frames captured by each of the plurality of cameras.

Referring again to FIG. 1, the system generates a 3D pose for each detected referee in an operation 115. As discussed in more detail below, a result of the 3D pose generation process is used to identify an action (if any) being performed by the referee. The 3D referee pose generation is performed using the results of the 2D pose estimations performed in the operation 110. As discussed in more detail below, the 3D referee pose generations are performed by analyzing each of the bounding boxes associated with a given referee to determine the referee's pose. For example, if the system includes 4 cameras, the system may generate 4 bounding boxes for the given referee in the operation 105, each of which originates from a captured video frame of one of the 4 cameras. This assumes that the given referee is in the field of view of all 4 cameras. The system also generates 4 2D pose estimates for the given referee in the operation 110, each of which corresponds to one of the 4 bounding boxes. These 2D pose estimates are used to generate the 3D referee poses, as described below in detail.

FIG. 5 is a flow diagram depicting a 3D referee pose generation process in accordance with an illustrative embodiment. In alternative embodiments, fewer, additional, and/or different operations may be performed. Additionally, the use of a flow diagram is not meant to be limiting with respect to the order of operations performed. In an illustrative embodiment, the 3D referee pose generation process is performed in part using a principle axis-based correspondence technique to group together all of the bounding boxes associated with a given referee. For example, if the system includes 4 cameras and there are four detected referees, the maximum resulting number of referee bounding boxes is 16 (i.e., one bounding box for each referee from each camera). The may be less referee bounding boxes if a referee is not in the field of view of all 4 cameras. The principle axis-based correspondence technique is used to identify which of the 16 (or less) referee bounding boxes corresponds to each of the referees. The principle axis-based correspondence technique is described with reference to operations 500-520 of FIG. 5. In alternative embodiments, a different technique may be used to determine which bounding boxes are associated with each referee.

In an operation 500, the system calculates a homography matrix for each camera. The homography matrix is a mapping that associates each pixel in a camera's field of view with a point on the ground plane. The ground plane is a plane that includes at least a portion of the ground surface of the sporting venue. For example, in a football stadium, the ground plane is a plane that includes the playing surface of the football field. Similarly, in a basketball arena, the ground plane is a plane that includes the basketball court on which the game is played. In an illustrative embodiment, the homography matrix is calculated as a series of perspective transformations that map 3D points onto a 2D image plane. The homography matrix is calculated based on camera characteristics including focal length, optical center, rotation, and translation, and can be determined using any techniques known in the art. The homography matrix for each camera can be calculated in advance of video capture and stored in a database or other memory location that is accessible during the 3D referee pose estimation process.

In an operation 505, the system estimates a vertical line for each referee bounding box that was identified in the operation 105 of FIG. 1. The vertical line extends vertically within the 2D bounding box from a portion of the referee that is in contact with the ground or other ground surface on which the referee is located. For example, the vertical line may extend from the center of the right foot (or right ankle) of the referee up to a head of the referee or up to the top of the bounding box. Alternatively, the vertical line can extend upward from the center of the left foot (or left ankle) of the referee, upward from a point that is centered between the right and left feet (or ankles) of the referee, etc. In an illustrative embodiment, the same starting location for the vertical line (e.g., center of the left ankle of the referee) is used in all of the referee bounding boxes that have been identified by the system. The starting location is known from the 2D referee pose estimations that are generated for each of the bounding boxes in the operation 110 of FIG. 1.

In an operation 510, the system converts each of the vertical lines to a principal line using the homography matrix. Specifically, the system uses the homography matrix to apply a homography transform to the vertical line associated with each referee bounding box. The homography transform converts the vertical line in the plane of each bounding box to a principal line on the ground plane that includes the ground surface of the sporting venue. In an operation 515, the system identifies intersections of the principal lines. The intersections can be determined using any image processing technique known in the art. In an operation 520, the system identifies the bounding boxes associated with each detected referee based on the intersections identified in the operation 515. As an example, the system may identify referee bounding boxes 1-10. If the operation 515 results in a point of intersection of principal lines from the $1^{st}$, $5^{th}$, and $9^{th}$ referee bounding boxes, the system associates the $1^{st}$, $5^{th}$, and $9^{th}$ bounding boxes as all corresponding to different views of the same referee.

The results of the operations 505-520 are visually depicted in FIG. 6. Specifically, FIG. 6 depicts association of referee bounding boxes for a given referee in accordance with an illustrative embodiment. As shown in the simplified example of FIG. 6, there are four referee bounding boxes, including a referee bounding box 600 detected from a video frame of a first camera, a referee bounding box 605 detected from a video frame of a second camera, a referee bounding box 610 detected from a video frame of a third camera, and a referee bounding box 615 detected from a video frame of a fourth camera. The referee bounding boxes are generated in accordance with the techniques described with reference to FIGS. 1 and 2. The referee bounding box 600 depicts a rear view of the referee, the referee bounding box 605 depicts a front view of the referee, the referee bounding box 610 depicts a rear perspective view of the referee, and the referee bounding box 615 depicts a side view of the referee. In alternative embodiments, the system may include additional cameras which generate additional and/or different views of the referee.

A vertical line is estimated for each of the bounding boxes 600-615. In this example, the vertical lines have a starting point that aligns with a center of the left ankle for the referee in each of the bounding boxes. Thus, a vertical line 620 extends upward from a center of the left ankle of the referee in the bounding box 600, a vertical line 625 extends upward from a center of the left ankle of the referee in the bounding box 605, a vertical line 630 extends upward from a center of the left ankle of the referee in the bounding box 610, and a vertical line 635 extends upward from a center of the left ankle of the referee in the bounding box 615. As discussed above, in alternative embodiments a different starting point for the vertical line may be designated, such as a center of the right ankle of the referee or a point located between the left and right ankles (or feet) of the referee. Additionally, the same starting point is used for all of the bounding boxes that have been determined to include a referee.

As discussed, a homography matrix associated with each camera is applied to the vertical lines to determine the corresponding principal lines. In the example of FIG. 6, a first homography matrix associated with the first camera is applied to the vertical line 620 of the first referee bounding box 600, a second homography matrix associated with the second camera is applied to the vertical line 625 of the first referee bounding box 605, a third homography matrix associated with the third camera is applied to the vertical line 630 of the third referee bounding box 610, and a fourth homography matrix associated with the fourth camera is applied to the vertical line 635 of the fourth referee bounding box 615. As shown, the vertical line 620 transforms to a principal line $P_1$ in a ground plane 640, the vertical line 625 transforms to a principal line $P_2$ in the ground plane 640, the vertical line 630 transforms to a principal line $P_3$ in the ground plane 640, and the vertical line 635 transforms to a principal line $P_4$ in the ground plane 640.

The principal lines $P_1$, $P_2$, $P_3$, and $P_4$ all intersect at a point C in the ground plane 640. The point C of intersection of the principal lines indicates to the system that all four principal lines correspond to the same left ankle, which indicates that the bounding boxes 600-615 all correspond to the same referee. Based on this analysis, the system is therefore able to determine that the bounding boxes 600-615 are all different views of the same referee, and the system groups (or associates) the bounding boxes 600-615 together for subsequent analysis of that referee. It is noted that FIG. 6 is a simplified example that includes bounding boxes associated with a single referee for the purpose of illustration. In practice, there may be a plurality of referees and the system identifies a corresponding plurality of points of intersection of principal lines. The principal lines associated with each of these points of intersection correspond to the bounding boxes of a given referee. Using this technique, the system is able to reliably identify all of the bounding boxes associated with each of a plurality of referees.

Referring back to the 3D referee pose generation process of FIG. 5, the system reconstructs each joint or other location of interest in 3D for each detected referee in an operation 525. The reconstruction is based on the 2D pose estimations generated in the operation 110 of FIG. 1. As discussed, the system generates a 2D pose estimation for each bounding box associated with a detected referee. Once the system determines which bounding boxes correspond to which officials in the operation 520, the system knows that the 2D pose estimations associated with those bounding boxes all correspond to the same referee. To reconstruct each joint or other location of interest in 3D, the system uses epipolar geometric constraints and Random Sample Consensus (RANSAC) to combine corresponding joints from each of the 2D pose estimations into a single 3D point. Any epipolar geometry and RANSAC techniques known in the art may be used. In alternative embodiments, a different technique may be used to determine the 3D point for each of the joints of the referee.

As an example, there may be 3 bounding boxes associated with a given referee, where each of the bounding boxes originates from a distinct camera and therefore represents a distinct view of the given referee. As discussed above, 2D pose estimation is performed on each of the 3 bounding boxes to identify the joints and other locations of interest of the given referee in each of the bounding boxes. Thus, each of the 3 bounding boxes may include a point representing the left elbow of the given referee. The operation 525 uses epipolar geometric constraints and RANSAC to determine the position of the left elbow in 3D based on the positions of these 3 points corresponding to the left elbow from the 2D pose estimations.

FIG. 7 depicts generation of a 3D point corresponding to the head of a referee in accordance with an illustrative embodiment. A bounding box 700, a bounding box 705, a bounding box 710, and a bounding box 715 each include a 2D pose estimation of the various joints and other locations of interest (i.e., body parts) for the referee depicted in each of the bounding boxes. One of the locations of interest included in the 2D pose estimations is the head of the referee. The system uses the head location from each of the 2D pose estimations in the bounding boxes 700-715 and the processing techniques described above to determine a 3D point 720, which is the location of the head in a 3D representation of the sporting venue.

Referring back to FIG. 5, the system repeats the operation 525 for each joint and location of interest for each of the referees. For example, for each referee, the system can repeat the operation 525 to determine the 3D locations of the referee's head, right shoulder, left shoulder, torso, right elbow, left elbow, right wrist, left wrist, left hip joint, right hip joint, left knee, right knee, left ankle, right ankle, etc. In an operation 530, the system generates the 3D pose for each detected referee based on the reconstructed joints. In one embodiment, each of the 3D reconstructed joints and other locations of interest for each referee are represented as points in a 3D grid. The system generates the 3D pose by connecting the adjacent points with lines to represent the 3D pose.

FIG. 8 depicts a 3D pose 800 of a referee in accordance with an illustrative embodiment. The 3D pose 800 is depicted on a 3D grid 805 which corresponds to at least a portion of the sporting venue. The 3D pose 800 includes 15 joints and locations of interest (i.e., body parts) which are connected to one another by lines to form the 3D pose 800. In alternative embodiments, fewer or additional joints and locations of interest may be used to generate the 3D pose.

The 3D pose generated in the operation 530 of FIG. 5 corresponds to a single video frame from each of the cameras that captured the given referee. The 3D pose is therefore a static pose that indicates the pose of the referee at a single point in time. In one embodiment, the system generates a temporal 3D pose for each referee by combining 2 or more static poses based on 2 or more consecutive video frames from each of the cameras that captured the referee. The temporal 3D pose allows the system to identify the sequence of movements of the referee. For example, a temporal 3D pose can indicate that the referee's arms are moving from his/her side to a position above his/her head. The temporal 3D pose can be generated by combining the static 3D poses from 2 consecutive frames, 3 consecutive frames, 5 consecutive frames, 10 consecutive frames, 100 consecutive frames, 150 consecutive frames, 500 consecutive frames, etc.

Referring back again to FIG. 1, once the 3D poses are generated for each detected referee in the operation 115, the system compares the 3D referee pose(s) to a pose database in an operation 120. As discussed above, the 3D poses used in the comparison can be static 3D poses or temporal 3D poses, depending on the implementation. The comparison is used to determine what (if any) action the referee is performing based on his/her 3D pose. The pose database includes a 3D pose representation of the various actions which the referee may perform during the sporting event. In one embodiment, the pose database includes only referee actions that indicate a start or stoppage in game play. For example, in the context of football, such referee actions include an action to start the game clock after a stoppage, an action indicating that a timeout has been called by one of the teams, an action indicating that touchdown has been scored, an action indicating a media timeout, an action indicating an injury on the field, an action indicating a successful field goal, etc. Alternatively, the pose database may include all actions that the referee may perform, regardless of whether the action indicates as start or stoppage in game play. The comparison of the 3D pose to the pose database can be performed using any image comparison techniques known in the art, such as pixel matching, etc.

The comparison of the operation 120 is performed using the 3D pose for each of the detected referees such that the actions of all referees are considered. In an alternative implementation, the system may only perform the comparison for a subset of the referees. For example, the system may distinguish among the detected referees based on the clothing worn by the officials and/or the locations of the officials on the sporting field. In such a scenario, the system may only generate the 3D pose for one of the officials, such as a head judge or lead official that performs all of the start/stop actions for the sporting event.

In an operation 125, a determination is made by the system regarding whether the 3D referee pose(s) indicate a stoppage in the sporting event. The determination is made based on the comparison performed in the operation 120. If the comparison indicates that one or more of the referees is performing an action that results in a stoppage of the sporting event, the system stops uploading captured video to the cloud for processing in an operation 130. As a result, the stoppages in game play such as commercial breaks, timeouts, halftime, etc. are not uploaded and remotely processed for providing 360 degree replay or viewing capability. As discussed herein, this saves significant costs that would otherwise be incurred by unnecessarily uploading and processing video of the game during stoppages. In an alternative embodiment, the system may be configured to take a different action in response to an affirmative determination in the operation 125, such as sending an instruction to a processing system indicating that the captured video during a given timeframe is not to be processed for the replay system because the timeframe corresponds to a stoppage.

If the determination of the operation 125 is negative, the system determines whether the 3D referee pose(s) indicate that the sporting event is resuming after a stoppage in an operation 135. This determination is again based on the comparison performed in the operation 120. If the determination in the operation 135 is affirmative, the system resumes uploading captured video for processing in an operation 140. In an alternative embodiment, the system may perform a different action responsive to an affirmative determination in the operation 135. As one example, the different action can be sending an instruction to a processing system indicating that the processing system should resume processing received video for the replay system. If the determination in the operation 135 is negative or if either of the operations 130 and 140 is performed, the process returns to the operation 100. As such, the system is continually generating 3D poses for each referee and determining whether any of the 3D poses indicates a start or stoppage of game play. In this way, the system is able to limit the amount of data that is transmitted for remote (or local) processing, and also the amount of actual processing that is performed. Given the excessive costs to run such a complicated video capture system, the proposed techniques can result in a significant cost savings for the system operator. In an alternative embodiment, the system may make determinations based on any of the 2D poses described herein. In such an implementation, the system may not generate the 3D pose.

Figure 9:
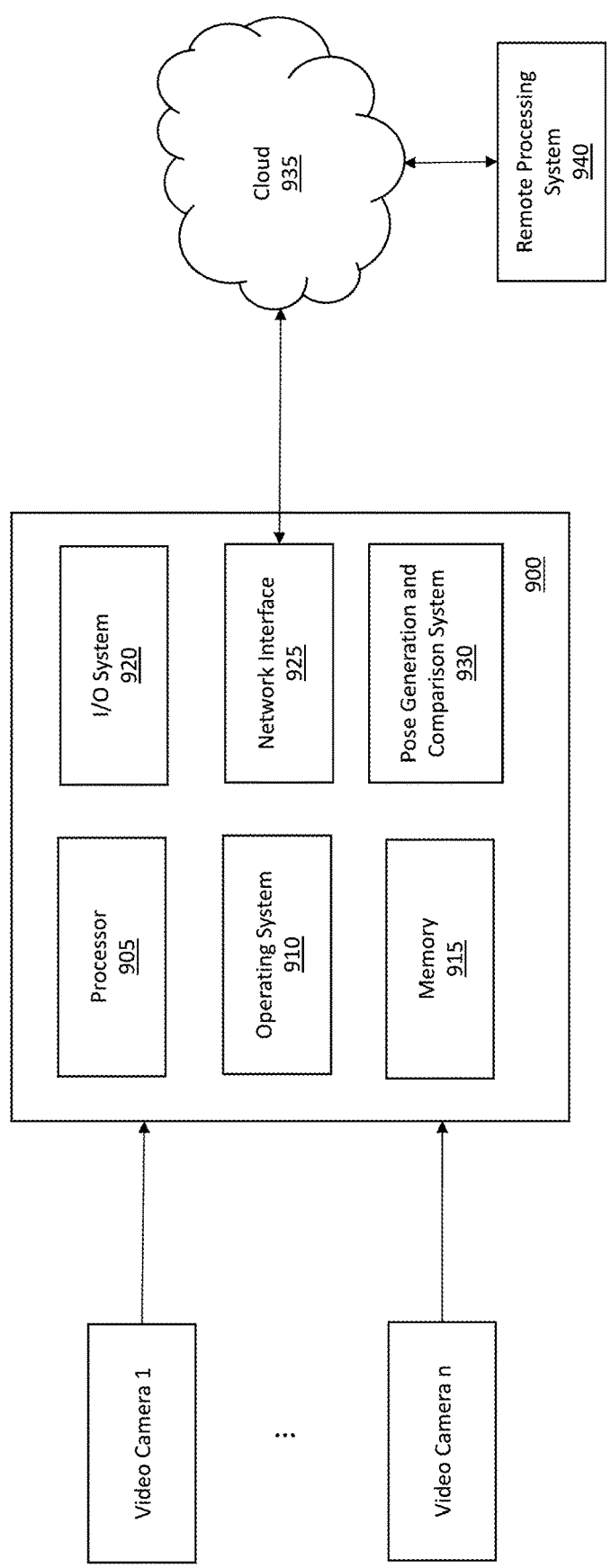
FIG. 9 is a block diagram of a video capturing and processing system for sporting events in accordance with an illustrative embodiment.

FIG. 9 is a block diagram of a video capturing and processing system for sporting events in accordance with an illustrative embodiment. The video capturing and processing system includes one or more video cameras. In the embodiment of FIG. 9, the system includes video cameras 1-*n*, where n can be any number such as 2, 3, 4, 5, 10, 15, 25, 50, etc. depending on the sporting event and sporting venue. In an alternative implementation, the system may include a single video camera. Any type of video cameras known in the art may be used. In an illustrative embodiment, the video cameras are positioned relative to one another to provide a 360 degree view of the sporting venue or an area of the sporting venue where the event takes place (e.g., football field, soccer field, basketball court, etc.). This 360 degree view enables an end user to view the sporting event from any desired angle and watch replays from any desired angle.

The video cameras 1-*n* each capture video frames in their field of view. These video frames are provided to a computing system 900. In an illustrative embodiment, the computing system 900 is located at or near the sporting venue. The computing system 900 receives the captured video frames from the video cameras 1-*n* through a wired or wireless connection using any data transmission techniques known in the art.

The computing system 900 includes a processor 905, an operating system 910, a memory 915, an I/O system 920, a network interface 925, and a pose generation and comparison system 930. In alternative embodiments, the computing system 900 may include fewer, additional, and/or different components. The components of the computing system communicate with one another via one or more buses or any other interconnect system. The computing system 900 can be distributed, or incorporated into a device such as a laptop computer, desktop computer, workstation, server, etc.

The processor 905 can be any type of computer processor known in the art, and can include a plurality of processors and/or a plurality of processing cores. The processor 905 can include a controller, a microcontroller, an audio processor, a graphics processing unit, a hardware accelerator, a digital signal processor, etc. Additionally, the processor 905 may be implemented as a complex instruction set computer processor, a reduced instruction set computer processor, an x86 instruction set computer processor, etc. The processor 905 is used to run the operating system 910, which can be any type of operating system.

The operating system 910 is stored in the memory 915, which is also used to store programs, network and communications data, peripheral component data, venue data for masking, pre-trained classifiers and other referee identification information, a pose database, and other operating instructions. The memory 915 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 920 is the framework which enables users and peripheral devices to interact with the computing system 900. The I/O system 920 can include a mouse, a keyboard, one or more displays, a speaker, a microphone, etc. that allow the user to interact with and control the computing system 900. The I/O system 920 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc.

The network interface 925 includes transceiver circuitry that allows the computing system to transmit and receive data to/from other devices such as remote computing systems, servers, websites, etc. The network interface 925 enables communication through the cloud 935, which can be in the form of one or more communication networks and devices. For example, the cloud 935 can include a cable network, a fiber network, a cellular network, a wi-fi network, a landline telephone network, a microwave network, a satellite network, etc. and any devices/programs accessible through such networks. The network interface 925 also includes circuitry to allow device-to-device communication such as Bluetooth® communication.

The pose generation and comparison system 930 includes hardware and/or software, and is configured to perform any of the operations described herein. Software of the pose generation and comparison system 930 is stored in the memory 915. As an example, the pose generation and comparison system 930 includes computer-readable instructions to perform referee localization, to perform 2D referee pose estimation, to generate static and/or temporal 3D poses for each detected referee, to compare the generated 3D referee poses to a pose database, to determine whether any of the referees is performing an action that starts or stops game action based on the comparison, and to control the upload and/or processing of captured video based on the determination. The pose generation and comparison system 930 can utilize the processor 905 and/or the memory 915.

Alternatively, the pose generation and comparison system 930 may include its own processor(s) and/or memory system(s).

The video capturing and processing system also includes a remote processing system 940 in communication with the computing system 900 through the cloud 935. In an illustrative embodiment, the remote processing system 940 receives captured video from the computing system 900 and processes the received video to enable 360 degree replays and/or viewing of an event by home viewers. In alternative embodiments, the remote processing system 940 may perform different and/or additional processing. Additionally, in some implementations, the processing system may be located locally at the sporting venue as opposed to being remote. As discussed herein, the pose generation and comparison system 930 is used to identify stoppages in an event being processed by the remote processing system 940. In one implementation, upon identification of a stoppage, the computing system 900 stops sending captured video to the remote processing system 940. Upon determination that the event is beginning or continuing, the computing system 900 resumes sending captured video to the remote processing system 940. As a result, the remote processing system 940 only receives and processes video corresponding to the actual event, and not the stoppages therein. As discussed, this conserves resources and provides cost savings to the system operator.

EXAMPLES

Embodiments disclosed herein can be implemented as hardware, software, firmware, and/or special purpose processing devices. As an example, a non-transitory computer-readable storage medium has instructions stored thereon that, when executed by one or more processors, cause operations described herein to be performed, such as performing referee localization, performing 2D referee pose estimation, generating static and/or temporal 3D poses for each detected referee, comparing the generated 3D referee poses to a pose database, determining whether any of the referees is performing an action that starts or stops game action based on the comparison, controlling the upload and/or processing of captured video based on the determination, etc. The instructions can be encoded using a programming language such as C, C++, Java, JavaScript, Visual Basic, proprietary languages, etc. The instructions are provided in the form of software applications tangibly embodied on storage medium.

The non-transitory computer-readable medium can be any type of medium able to store digital information, such as a hard drive, a server, a flash memory, random access memory (RAM), a combination of memories, etc. In some embodiments, the components described herein can be implemented using hardware such as field-programmable gate arrays (FPGAs), application-specific integrated circuits (ASICs), etc. It should be apparent that any suitable combination of hardware, software, and firmware can be used to implement the described embodiments, and that the described embodiments are not limited to any particular architecture.

As one example, a video capture and processing system includes a memory and a processor operatively coupled to the memory. The system can also include other components such as one or more video cameras, an I/O system, a network interface, and a pose generation and comparison system. The memory is configured to store a pose database that includes poses that indicate a start or a stoppage in an event. The processor is configured to generate a three-dimensional (3D) pose of an individual in a video frame of captured video of the event. The individual can be a referee that uses various poses to start or stop the event. The processor of the system also determines, based on the pose database, whether the 3D pose of the individual indicates a start or a stoppage in the event. Specifically, the processor compares the generated 3D pose to poses in the pose database to determine whether the individual's current pose indicates that the event is to be commenced or stopped. The processor is also configured to control an upload of video of the event based on the determination of whether the 3D pose indicates the start or the stoppage in the event. Specifically, the processor stops the upload of the video to a remote location responsive to a determination that the 3D pose indicates a stoppage in the event, and the processor commences the upload of the video to the remote location responsive to a determination that the 3D pose indicates a start of the event.

In addition to controlling uploading, the determined pose can also be used to control recording, broadcasting, storing, translating, transcribing, etc. of the event. For example, in one implementation, an identified pose indicative of a stoppage can cause the system to stop recording, broadcasting, etc. of the event. Similarly, an identified pose indicative of a start (or resuming) of the event can cause the system to commence recording, broadcasting, etc. of the event.

The video capture and processing system also uses the processor to apply a mask to the video frame. The mask identifies a portion of the video frame in which the individual is supposed to be located. The mask does so by excluding portions of the video frame in which the referee is not expected to be located. As an example, a referee of a sporting event is typically assigned to one or more areas of the venue in which the sporting event is taking place. The one or more areas are analyzed by the system to generate the 3D pose, but other areas are excluded by the mask to conserve resources and increase efficiency of the system.

In some implementations, the processor of the video capture and processing analyzes a plurality of video frames, each of which is captured by a distinct video camera positioned at the venue. As an example, the processor analyzes a first video frame captured by a first video camera and a second video frame captured by a second video camera. The first video frame therefore includes a first view of the referee and the second video frame includes a second view of the referee. As described in detail below, the 3D pose of the referee is generated based on the first video frame and the second video frame.

The first and second video frames may include additional referees and non-referees such as players, cheerleaders, mascots, etc. The processor is configured to detect a first plurality of individuals in the first video frame and a second plurality of individuals in the video frame. The processor also generates a bounding box for each of the first plurality of individuals detected in the first video frame and each of the second plurality of individuals detected in the second video frame. The processor analyzes the generated bounding boxes for the first video frame and the second video frame to identify one or more bounding boxes corresponding to one or more referees. In one implementation, the processor analyzes all of the generated bounding boxes with a pre-trained classifier that distinguishes referees from non-referees in order to identify the one or more bounding boxes corresponding to the one or more referees.

The processor of the system is also configured to generate a two dimensional (2D) pose for each of the one or more bounding boxes corresponding to the one or more referees. The 2D pose for a given referee includes a plurality of points corresponding to a plurality of joints and/or other body parts of the given referee. At this point, the system has a plurality of 2D poses corresponding to a plurality of bounding boxes that include referees, where the plurality of bounding boxes were generated based on the first video frame and the second video frame. The referee can be a first referee, and as noted above, the first referee appears in the first video frame and the second video frame. Using a principal line based method, the system identifies the bounding box from the first video frame that corresponds to the first referee and the bounding box from the second video frame that corresponds to the first referee. The system does the same for a second referee, third referee, etc. such that each referee has an associated group of bounding boxes (and 2D poses) based on the various views in which the referee is captured.

To perform the principal line based method to group bounding boxes for each referee, the processor of the system generates a vertical line for each of the one or more bounding boxes corresponding to the one or more referees. Each vertical line has a starting location that is based on the 2D pose associated with each of the one or more bounding boxes of the referees. The processor is configured to convert each vertical line into a principal line, where the principal line maps the vertical line onto a ground plane of the venue in which the event is held. In the scenario with two video cameras, the processor uses a first homography matrix associated with the first video camera to convert vertical lines (to principal lines in the ground plane) for bounding boxes generated from the first video frame, and the processor uses a second homography matrix associated with the second video camera to convert vertical lines (to principal lines on the ground plane) for bounding boxes generated from the second video frame. The processor identifies an intersection of principal lines in the ground plane. The principal lines that form the intersection correspond to vertical lines of bounding boxes that include different views of the same referee. The processor is therefore able to identify, based on the intersections, groups of the bounding boxes that include different views of the same referee. The processor of the system is also configured to reconstruct each of the plurality of joints for each referee in a three dimensional (3D) grid based on the 2D pose generated for each of the bounding boxes in the group of bounding boxes that include different views of the that referee. The processor generates the 3D pose based on the reconstruction of each of the plurality of joints in the 3D grid.

As another example, a method of capturing and processing video includes analyzing, by a processor of a computing system, a plurality of video frames depicting a plurality of views of an event. Each video frame in the plurality of video frames is captured by a distinct video camera. The method also includes generating, by the processor, a three-dimensional (3D) pose of a referee that is captured in one or more of the plurality of video frames. The method also includes determining, by the processor and based on a pose database stored in a memory of the computing system, whether the 3D pose of the referee indicates a start or a stoppage in the event. The method further includes controlling, by the processor, an upload of video of the event based on the determination of whether the 3D pose indicates the start or the stoppage in the event. Controlling the upload of the video includes stopping the upload of the video to a remote location responsive to a determination that the 3D pose indicates the stoppage in the event, and commencing the upload of the video to the remote location responsive to a determination that the 3D pose indicates the start of the event.

In one implementation, the referee is captured in a first video frame and a second video frame of the plurality of video frames. The method further includes generating, by the processor, a first bounding box for the referee in the first video frame and a second bounding box for the referee in the second video frame. The method also includes generating, by the processor, a first 2D) pose associated with a first view of the referee in the first bounding box and a second 2D pose associated with a second view of the referee in the second bounding box. The 3D pose is generated based on the first 2D pose and the second 2D pose.

As another example, a non-transitory computer-readable storage medium has computer-readable instructions stored thereon that, upon execution by one or more processors in a video capturing and processing system, result in operations being performed. The operations include analyzing a plurality of video frames depicting a plurality of views of an event. Each video frame in the plurality of video frames is captured by a distinct video camera. The operations also include generating a 3D pose of a referee that is captured in one or more of the plurality of video frames. The operations also include determining, based on a pose database, whether the 3D pose of the referee indicates a start or a stoppage in the event. The operations further include controlling an upload of video of the event based on the determination of whether the 3D pose indicates the start or the stoppage in the event.

In this example, the referee is captured in a first video frame and a second video frame of the plurality of video frames. The operations also include generating a first bounding box for the referee in the first video frame and a second bounding box for the referee in the second video frame. The operations further include generating a first 2D pose associated with a first view of the referee in the first bounding box and a second 2D pose associated with a second view of the referee in the second bounding box. The 3D pose is generated based on the first 2D pose and the second 2D pose.

The embodiments described herein have focused on use of a system for controlling the upload/processing of video for a sporting event. While many of the examples provided herein reference the game of football, the proposed methods and systems can be used for any other sporting events as discussed above. Additionally, the proposed methods and systems are not limited to use during sporting events, and can also be used for other types of entertainment events such as a dance recital, a choir presentation, a band performance, a musical concert, an opera, a play, etc. In such embodiments, the system can analyze the actions of a performer, official, designated individual, object, etc. (instead of one or more referees) to determine whether video uploading and/or processing should be paused/commenced.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A video capture and processing system comprising:
a memory configured to store a pose database, wherein the pose database includes a first pose that indicates a resumption of an ongoing event and a second pose that indicates a pause in the ongoing event; and
a processor operatively coupled to the memory, wherein the processor is configured to:
generate a pose of an individual in a video frame of captured video of the event;
identify, from the pose database, whether the pose of the individual matches the first pose or the second pose; and
determine, based on the identified pose, whether the individual has indicated the resumption or the pause of the ongoing event,
wherein the processor is configured to stop an upload of video of the event to a remote location responsive to a determination that the pose indicates a pause in the event, and wherein the processor is configured to commence the upload of the video to the remote location responsive to a determination that the pose indicates a resumption of the event.

2. The video capture and processing system of claim 1, wherein the processor is configured to apply a mask to the video frame, wherein the mask identifies a portion of the video frame in which the individual is supposed to be located.

3. The video capture and processing system of claim 1, wherein the video frame comprises a first video frame captured by a first video camera, and wherein the pose of the individual is generated based on the first video frame and a second video frame captured by a second video camera.

4. The video capture and processing system of claim 3, wherein the processor is configured to detect a first plurality of individuals in the first video frame and a second plurality of individuals in the second video frame.

5. The video capture and processing system of claim 4, wherein the processor is configured to:
generate a bounding box for each of the first plurality of individuals detected in the first video frame and each of the second plurality of individuals detected in the second video frame; and
analyze the generated bounding boxes for the first video frame and the second video frame to identify one or more bounding boxes corresponding to one or more referees.

6. The video capture and processing system of claim 5, wherein the processor analyzes the generated bounding boxes with a pre-trained classifier that distinguishes referees from non-referees.

7. The video capture and processing system of claim 5, wherein the processor is configured to generate a two dimensional (2D) pose for each of the one or more bounding boxes corresponding to the one or more referees.

8. The video capture and processing system of claim 7, wherein the 2D pose for a given referee includes a plurality of points corresponding to a plurality of joints of the given referee.

9. The video capture and processing system of claim 8, wherein the processor is configured to generate a vertical line for each of the one or more bounding boxes corresponding to the one or more referees, wherein each vertical line has a starting location that is based on the 2D pose associated with each of the one or more bounding boxes.

10. The video capture and processing system of claim 9, wherein the processor is configured to convert each vertical line into a principal line, wherein the principal line maps the vertical line onto a ground plane of a venue in which the event is held.

11. The video capture and processing system of claim 10, wherein the processor uses a first homography matrix associated with the first video camera to convert vertical lines in bounding boxes generated from the first video frame, and wherein the processor uses a second homography matrix associated with the second video camera to convert vertical lines in bounding boxes generated from the second video frame.

12. The video capture and processing system of claim 10, wherein the processor is configured to:
identify an intersection of principal lines in the ground plane, wherein the principal lines that form the intersection correspond to vertical lines of bounding boxes that include different views of the given referee; and
identify, based on the intersection, a group of the bounding boxes that include the different views of the given referee, wherein the different views of the given referee include a first view captured by the first video camera in the first video frame and a second view captured by the second video camera in the second video frame.

13. The video capture and processing system of claim 12, wherein the processor is configured to reconstruct each of the plurality of joints of the given referee in a three dimensional (3D) grid based on the 2D pose generated for each of the bounding boxes in the group of bounding boxes that include the different views of the given referee.

14. The video capture and processing system of claim 13, wherein the individual is the given referee, wherein the pose comprises a three dimensional (3D) pose, and wherein the processor generates the 3D pose based on the reconstruction of each of the plurality of joints in the 3D grid.

15. A method of capturing and processing video, the method comprising:
analyzing, by a processor of a computing system, a plurality of video frames depicting a plurality of views of an ongoing event, wherein each video frame in the plurality of video frames is captured by a distinct video camera;
generating, by the processor, a pose of a referee that is captured in one or more of the plurality of video frames;
determining, by the processor and based on a pose database stored in a memory of the computing system, whether the pose of the referee indicates a resumption or a pause in the ongoing event; and
controlling an upload of video of the event by stopping the upload of the video to a remote location responsive to a determination that the pose indicates the pause in the ongoing event, and commencing the upload of the video to the remote location responsive to a determination that the pose indicates the resumption of the ongoing event.

16. The method of claim 15, wherein the referee is captured in a first video frame and a second video frame of the plurality of video frames, and further comprising:
generating, by the processor, a first bounding box for the referee in the first video frame and a second bounding box for the referee in the second video frame;
generating, by the processor, a first two dimensional (2D) pose associated with a first view of the referee in the first bounding box and a second 2D pose associated with a second view of the referee in the second bounding box; and wherein the pose comprises a three-dimensional (3D) pose that is generated based on the first 2D pose and the second 2D pose.

17. A non-transitory computer-readable storage medium having computer-readable instructions stored thereon that, upon execution by one or more processors in a video capturing and processing system, result in operations comprising:

analyzing a plurality of video frames depicting a plurality of views of an ongoing event, wherein each video frame in the plurality of video frames is captured by a distinct video camera;

generating a pose of a referee that is captured in one or more of the plurality of video frames;

determining, based on a pose database, whether the pose of the referee indicates a resumption or a pause in the ongoing event; and controlling an upload of video of the event by stopping the upload of the video to a remote location responsive to a determination that the pose indicates the pause in the ongoing event, and commencing the upload of the video to the remote location responsive to a determination that the pose indicates the resumption of the ongoing event.

18. The non-transitory computer-readable storage medium of claim 17, wherein the referee is captured in a first video frame and a second video frame of the plurality of video frames, the operations further comprising:

generating a first bounding box for the referee in the first video frame and a second bounding box for the referee in the second video frame;

generating a first two dimensional (2D) pose associated with a first view of the referee in the first bounding box and a second 2D pose associated with a second view of the referee in the second bounding box; and wherein the pose comprises a three-dimensional (3D) pose, and wherein the 3D pose is generated based on the first 2D pose and the second 2D pose.

19. The method of claim 15, further comprising applying a mask to the one or more of the plurality of video frames in which the pose of the referee is captured, wherein the mask identifies a portion of the one or more of the plurality of video frames in which the referee is supposed to be located.

20. The method of claim 15, wherein the one or more of the plurality of video frames comprises a first video frame captured by a first video camera and a second video frame captured by a second video camera, and wherein the pose of the referee is generated based on the first video frame and the second video frame.

21. The method of claim 20, further comprising detecting a first plurality of referees in the first video frame and a second plurality of referees in the second video frame.

22. The non-transitory computer-readable storage medium of claim 17, wherein the operations further comprise applying a mask to the one or more of the plurality of video frames in which the pose of the referee is captured, wherein the mask identifies a portion of the one or more of the plurality of video frames in which the referee is supposed to be located.

23. The non-transitory computer-readable storage medium of claim 17, wherein the one or more of the plurality of video frames comprises a first video frame captured by a first video camera and a second video frame captured by a second video camera, and the operations further comprise generating the pose of the referee based on the first video frame and the second video frame.

24. The non-transitory computer-readable storage medium of claim 23, wherein the operations further comprise detecting a first plurality of referees in the first video frame and a second plurality of referees in the second video frame.

25. The non-transitory computer-readable storage medium of claim 24, wherein the operations further comprise:

generating a bounding box for each of the first plurality of referees detected in the first video frame and each of the second plurality of referees detected in the second video frame; and analyzing the generated bounding boxes for the first video frame and the second video frame to identify one or more bounding boxes corresponding to one or more referees.

* * * * *